(12) United States Patent
Torii et al.

(10) Patent No.: US 6,751,681 B2
(45) Date of Patent: Jun. 15, 2004

(54) SYSTEM AND METHOD FOR PROVIDING AUTOMATIC FIRMWARE UPDATES AND DIAGNOSTICS FOR NETWORK ATTACHED STORAGE DEVICES

(75) Inventors: Shinichiro Kenneth Torii, San Jose, CA (US); Nathan Chan, Sunnyvale, CA (US); Paresh Desai, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 311 days.

(21) Appl. No.: 09/884,740

(22) Filed: Jun. 18, 2001

(65) Prior Publication Data

US 2002/0194582 A1 Dec. 19, 2002

(51) Int. Cl.$^7$ .................................................. G06F 3/00
(52) U.S. Cl. .......................... 710/8; 710/15; 710/19; 710/104; 710/106; 711/170
(58) Field of Search ............................. 710/2, 6, 8, 15, 710/19, 104, 106; 709/220, 221; 711/170

(56) References Cited

U.S. PATENT DOCUMENTS

| 5,535,355 | A | * | 7/1996 | Scales | ......................... 711/101 |
|---|---|---|---|---|---|
| 6,009,274 | A | * | 12/1999 | Fletcher et al. | .............. 717/173 |
| 6,105,146 | A | * | 8/2000 | Tavallaei et al. | ................ 714/2 |
| 6,167,567 | A | * | 12/2000 | Chiles et al. | ................ 717/173 |
| 6,360,362 | B1 | * | 3/2002 | Fichtner et al. | ................ 77/168 |
| 6,493,796 | B1 | * | 12/2002 | Arnon et al. | ................ 711/114 |
| 6,557,054 | B2 | * | 4/2003 | Reisman | ....................... 710/33 |

FOREIGN PATENT DOCUMENTS

| JP | 09152941 A | * | 6/1997 | ............. G06F/3/06 |

* cited by examiner

Primary Examiner—Jeffrey Gaffin
Assistant Examiner—Eron Sorell
(74) Attorney, Agent, or Firm—Blakely, Sokoloff, Taylor & Zafman LLP

(57) ABSTRACT

A method and system for automatically implementing firmware revisions is disclosed. In one embodiment a plurality of storage devices are connected via a network. The storage devices are configured to implement firmware updates independent of any externally attached controller platforms. In an alternate embodiment, the system is also configured to provide self diagnostics, wherein defective drives attached to the system may be disabled.

16 Claims, 5 Drawing Sheets

SYSTEM AND METHOD FOR PROVIDING AUTOMATIC FIRMWARE UPDATES AND DIAGNOSTICS FOR NETWORK ATTACHED STORAGE DEVICES

FIELD OF THE INVENTION

The present invention relates generally to storage devices. More particularly, to a system and method for providing automatic firmware updates and diagnostics for coupled storage devices.

BACKGROUND OF THE INVENTION

Storage device networks typically must have their firmware updated by means of a separately attached host platform. Conventional means of providing such updates include tape, SCSI, and serial port propagation schemes. Although in wide use, there are significant disadvantages posed by such arrangements. For example in the case of tape propagation, several attendants must be employed to manually assist in providing the desired updates through additional tape device attachments. And, where PC platforms are utilized, programs must be written that involve time consuming coding, necessary to make compatible communication between the interconnected systems.

Previously, network attached storage devices (NAS devices) have operated only in target mode, receptive only to commands received from separately attached host platforms. By not recognizing the benefits of configuring the network attached devices to operate as firmware propagation initiators, the designers of such systems render them dependent on the unwieldy and time consuming methods noted above.

SUMMARY OF THE INVENTION

A method and system for automatically carrying out firmware revisions, and diagnostics are disclosed. The system provides for the automatic updating of connected storage devices, such as network attached devices (NAS devices) firmware by other attached devices. This is done if the device initiating the updates determines that it possesses the latest firmware revision. Conversely, if a device finds that its own firmware is older, it can retrieve the latest firmware from another attached device and update itself.

In another embodiment, the system provides for the automatic disabling of defective drives. In this embodiment a "pack leader" (storage device), that is attached, for example via a bus or network, is configured to disable a defective drive. This is done if the bad drive has detected through self-diagnostics that it contains some defect or anomaly.

Once this information has been communicated to the "pack leader" (for example, via a request that it not receive anymore media access commands), the "pack leader" then functions to disable the device.

BRIEF DESCRIPTION OF THE DRAWINGS

The objects, features and advantages of the present invention will be apparent to one skilled in the art in light of the following description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention.

Figure 1:
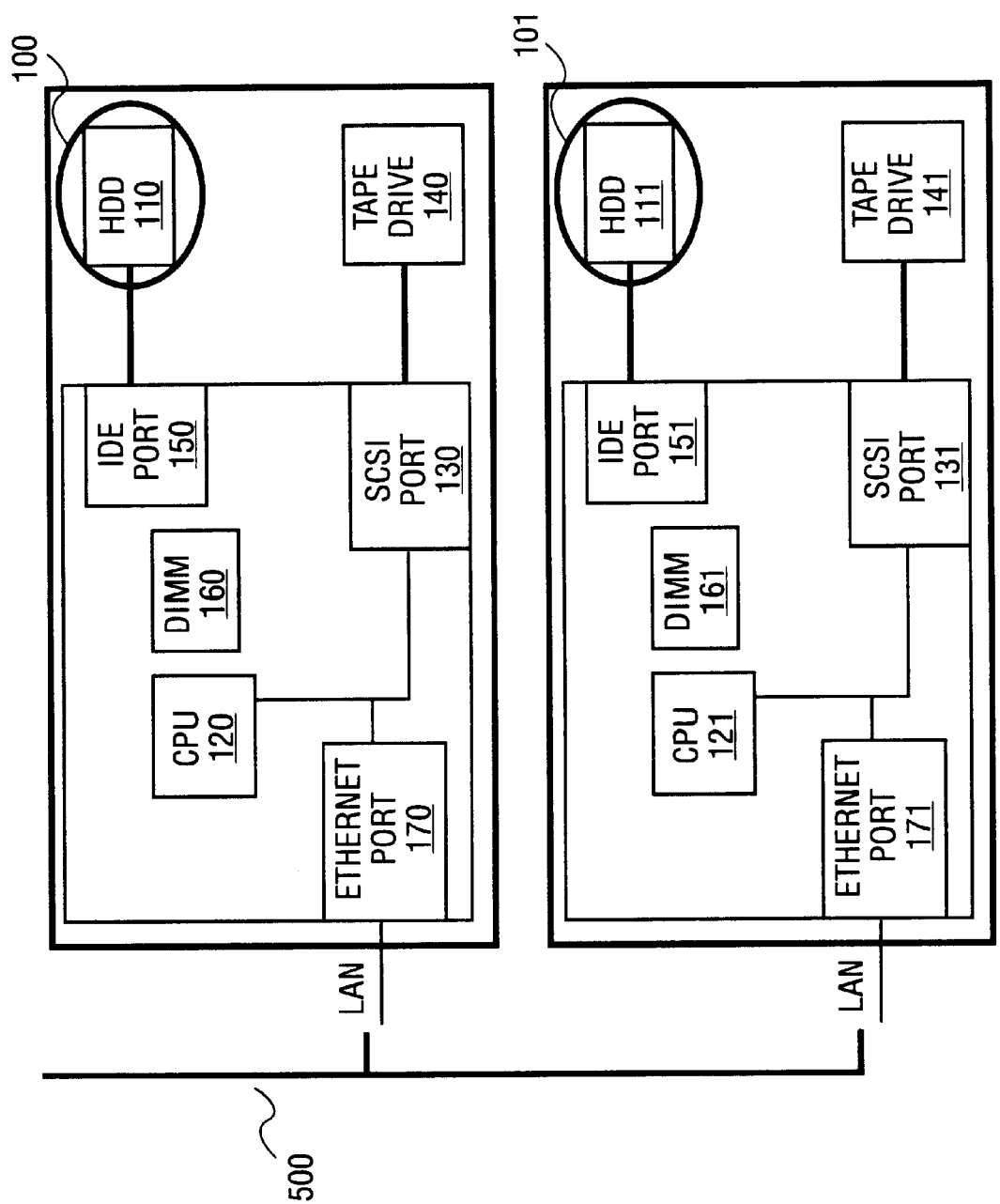
FIG. 1 is a schematic illustrating one embodiment of the firmware updating system in accordance with the teachings of the present invention.

The system of the present invention provides automatic code updates, such as firmware, for storage devices of a group of attached devices. The system also provides for the automatic disabling of such devices, when it is detected that they possess some defect or anomaly. A simplified block diagram of one embodiment of a system of storage devices is illustrated in FIG. 1. It should be realized that FIG. 1 illustrates but one embodiment. For example, FIG. 1 illustrates the invention in the context of network attached storage (NAS) devices. The devices may also be connected via a bus. Other embodiments including different components and connect structures may also be utilized.

Referring to FIG. 1, NAS device system includes HDD (hard disk drive) 110, IDE (integrated drive electronics) port 150, DIMM (dual in-line memory module) 160, CPU 120, Ethernet port 170, SCSI port 130, and tape drive 140. FIG. 1 also shows an NAS device 101. Both devices 100 and 101 are connected to LAN network 500.

HDD drive 110 may be used to store the operating system and buffer used for data transfer. DIMM element 160 may be used as the storage device's memory. CPU 120 executes instructions provided by computer readable media which may be HDD 110, DIMM 160 and other media including LAN 500. In the present embodiment, SCSI port 130 provides the device with a connection to tape drive 140, while Ethernet port 170 provides it with a connection to LAN 500. Other connection technologies, including, wired, wireless and optical connections, may also be used.

It should be noted that the function of unit 101 may, although not necessarily, be identical to that of unit 100. The firmware upgrading functionality discussed herein is, in one embodiment, implemented as a service (software) controlling the tape device (140 and 141). The software may reside in HDD device 110. The implemented functionality gives the device the capacity to update itself or any other device that is attached to the network.

Figure 2:
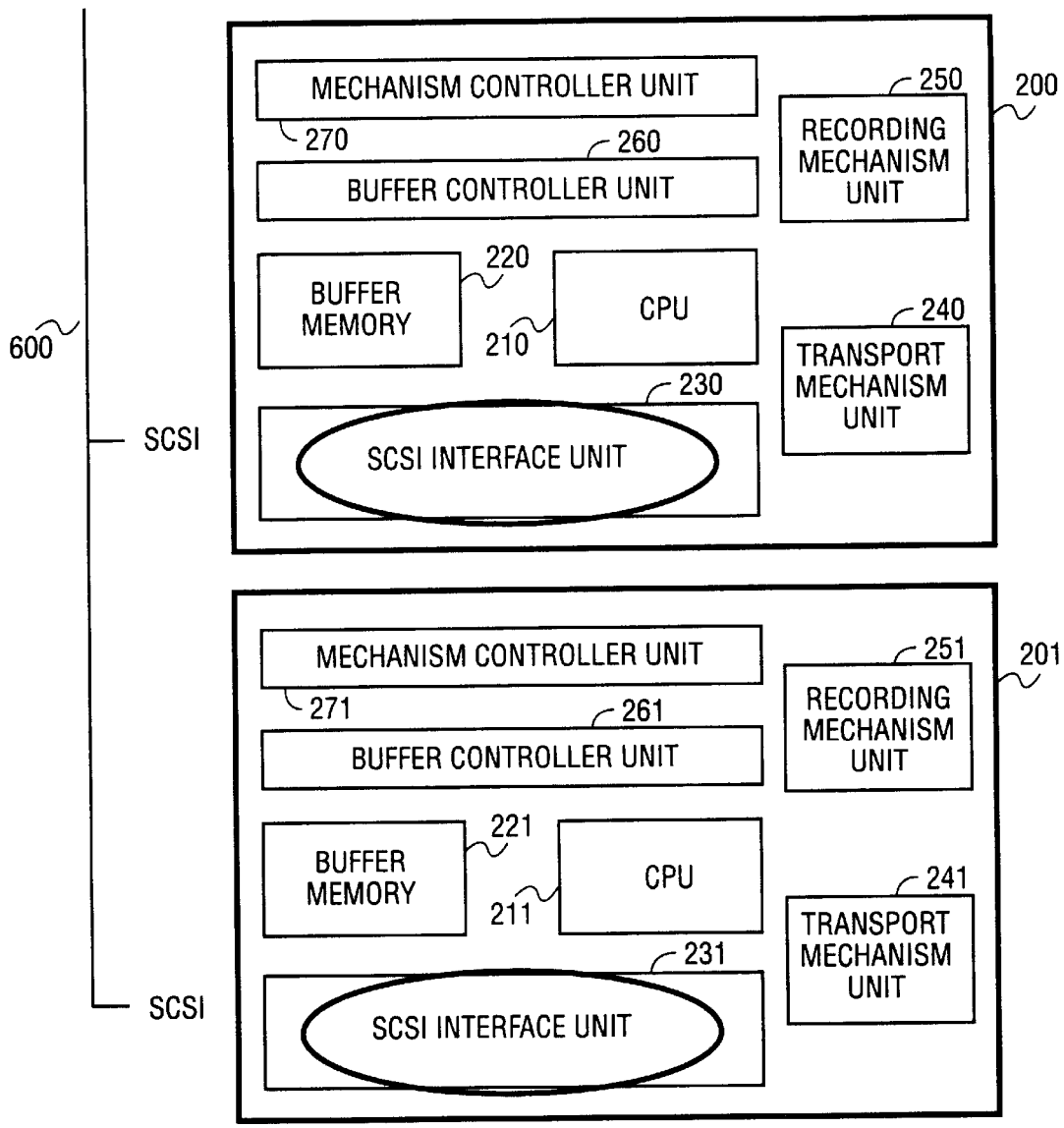
FIG. 2 is a schematic illustrating a second embodiment of the firmware updating system in accordance with the teachings of the present invention.

FIG. 2 is a simplified block diagram depicting another embodiment of the present invention. Referring to FIG. 2, tape drive 200 includes recording mechanism unit 250, transport mechanism unit 240, mechanism controller unit 270, buffer controller unit 260, CPU 210, buffer memory 220, and SCSI Interface Unit 230.

Recording mechanism 250 records data onto the tape. Transport Mechanism 240 provides for the mechanical movement of the tape. Buffer memory 220 stores incoming data. CPU 210 executes computer-readable instructions downloaded or programmed into the device to, in some instances control the device. SCSI interface unit 230 provides the connection to SCSI connection media, such as a SCSI bus or network 600. The mechanism control unit 270 controls the recording and transport mechanism, and buffer control unit 260 controls the buffer memory. Each tape device in this embodiment is connected via the SCSI Network. The firmware updating functionality is implemented as shown (See the encircled SCSI Interface Unit in FIG. 2) in the tape devices' firmware. This functionality provides the tape drive with the capacity to update itself, or any other drive that is attached to the network. Drive 201 is illustrated to have elements similar to those of drive 200; however in alternative embodiments drive 201 may have different elements that operate with the firmware updates as described herein.

Figure 3:
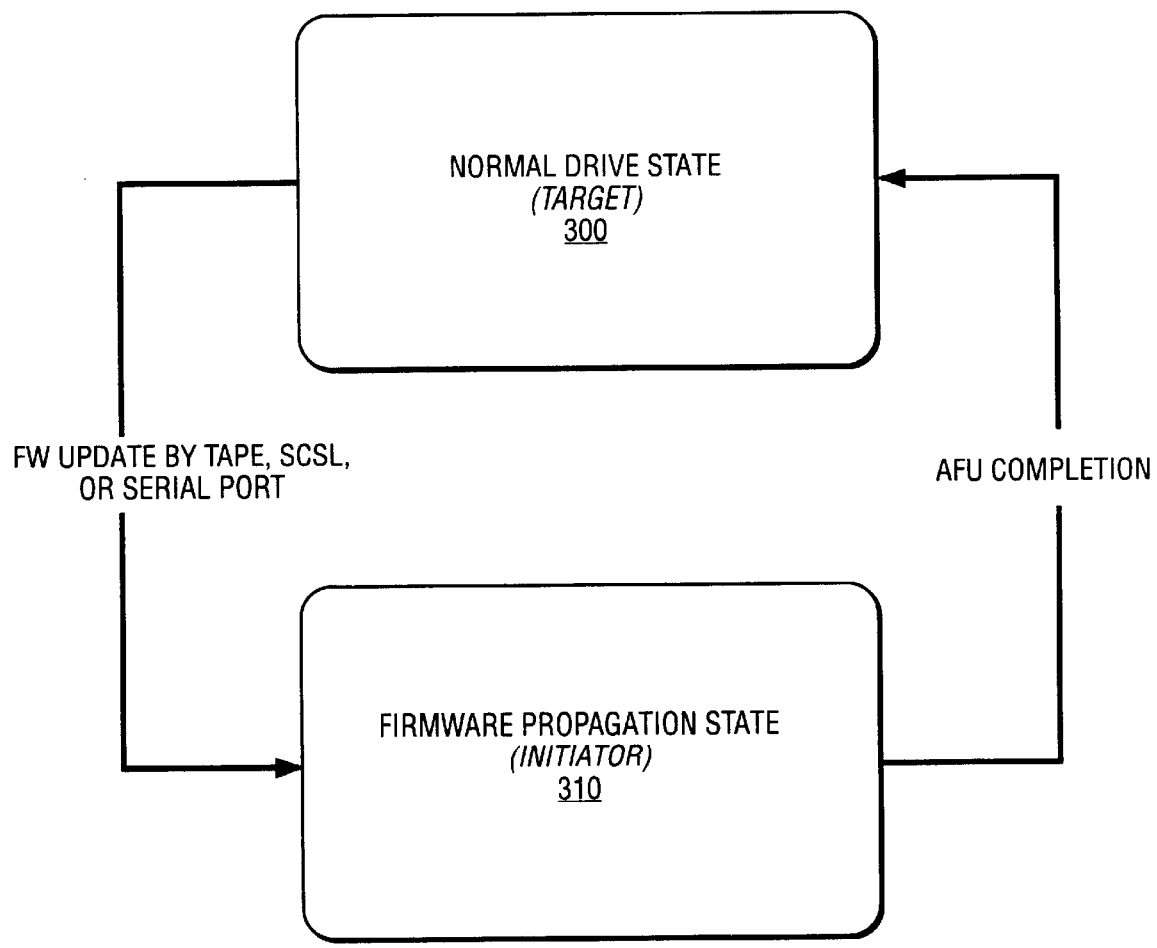
FIG. 3 and FIG. 4 are flow diagrams generally illustrating an embodiment of the firmware updating process of the present invention.
Figure 4:
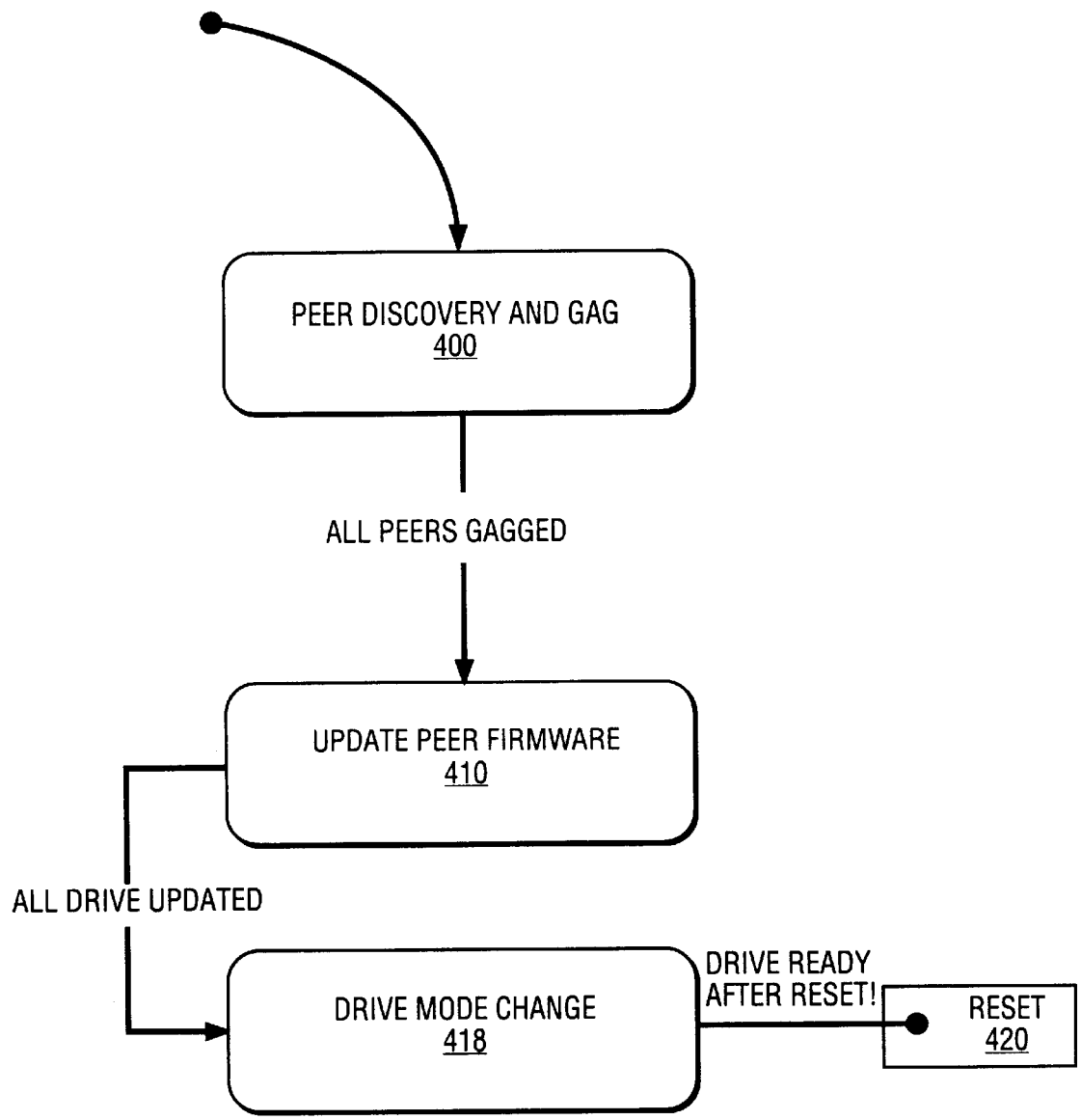

FIG. 3 and FIG. 4 depict a schematic representation describing one implementation of the automatic firmware update (AFU). Referring to FIG. 3, box 300 depicts a storage devices normal drive state, while box 310 depicts the devices firmware propagation state.

Referring to box 300, the normal drive state is the default behavior. The drive operates in target mode only. Typically, it does not send SCSI commands to other devices. However, after a firmware update by tape, SCSI, or Serial Port processes, the drive 310 enters the firmware propagation state (see box 310). In this state the drive has the ability to send SCSI commands to other devices on the bus. In one embodiment this process is typically initiated after initial firmware updates by conventional means.

Referring to FIG. 4, there is shown the operation of an exemplary drive after the drive enters the firmware propagation state. Box 400 illustrates the Peer Discover and Gag step. Here the device scans for peers of the same drive family using generic SCSI inquiry commands. It then issues a "gag" command to idle peer devices to prevent host intervention during the AFU process. After this step is completed, the automatic firmware update is initiated as shown in box 410. In one embodiment, a conventional SCSI write buffer command is used to upgrade the drives' firmware. Finally, the drive is reconfigured 418 to its normal state, for example by initiating a drive mode change, whereupon it issues a drive self reset command (see box 420).

Figure 5:
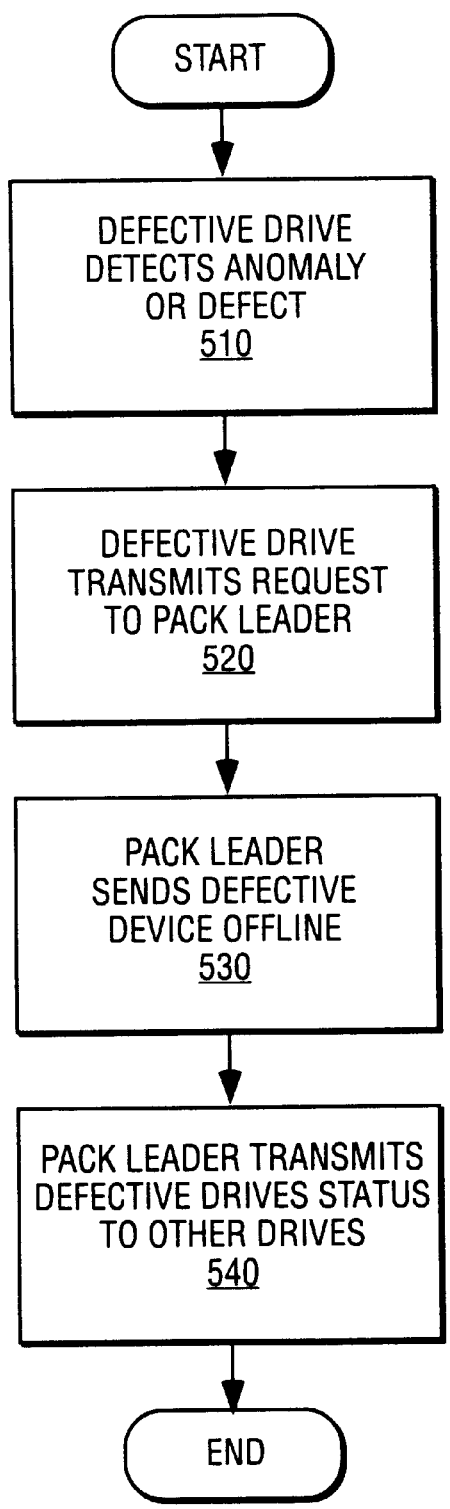
FIG. 5 is a flow chart illustrating an embodiment of the self diagnostic defect detecting process of the present invention.

FIG. 5 is a flowchart illustrating one embodiment of the drive disabling process of the present invention. With this process a "pack leader" (drive) can disable a bad drive so that it does not corrupt user data. In one embodiment, if a network attached device detects that it possesses some anomaly or defect, it can send a request to the "pack leader" that it should not receive anymore media access commands. Alternately, a pack leader or other attached device may have the capability to determine if a device has an anomaly or defect.

Referring to FIG. 5, at step 510, a defective drive detects that it possesses an anomaly or defect. A step 520, the defective drive transmits a request to the "pack leader". Once the "pack leader" receives this request, the "pack leader" issues a command that sends the defective drive offline (see step 530). At step 540 the "pack leader" transmits the defective drive's status to other network attached drives, therein completing the process. The processes described herein are implemented using standard commands.

Thus a system and method to provide automatic firmware updates and drive diagnostics have been provided. Although the present invention has been described with reference to specific exemplary embodiments it will be evident that various modifications and changes may be made to these embodiments without departing from the broader spirit and scope of the invention as set forth in the claims.

What is claimed is:

1. A system for automatically implementing firmware revisions comprising a plurality of storage devices connected via a network of attached devices, wherein at least one storage device is capable of updating firmware on at least one other storage device of the plurality of devices independent of any externally attached controller platforms, the at least one storage device comprising a first state and second state, the first state causing the at least one storage device to operate in a target mode wherein the at least one storage device only receives commands, and the second state, responsive to a firmware update of the at least one storage device, enabling the at least one storage device to send commands to the at least one other storage device to update firmware on the at least one other storage device.

2. The system of claim 1, wherein the storage device is selected from the group consisting of a disk drive and tape drive.

3. The system of claim 1, wherein the network is selected from the group consisting of a LAN network and a SCSI network.

4. The system as set forth in claim 1, wherein the at least one storage device is reconfigured to the first state after the firmware update of the at least one other storage device.

5. The system of claim 1, wherein a device of the plurality of storage devices can disable other network attached devices.

6. The system as set forth in claim 5, wherein a defective device of the plurality of storage devices issues a request to a predetermined device of the plurality of storage devices, the predetermined device configured to issue at least one command to disable the defective device and notify the plurality of storage devices of the defective device's status.

7. A storage device connected in a network of attached devices comprising:

a processor comprising a first and second state, the first state, causing the processor to operate in accordance with a target mode wherein the storage device only receives commands, the second state, responsive to a firmware update of the storage device, enabling the storage device to upgrade the storage device with the firmware update and send commands to at least one other storage device to update firmware on the at least one other storage device, wherein firmware is automatically updated independent of any externally attached controller platforms; and a memory configured to accept the updated firmware.

8. The storage device of claim 7, wherein the storage device is selected from the group consisting of a disk drive and tape drive.

9. The storage device of claim 7, wherein the network is selected from the group consisting of a LAN network and a SCSI network.

10. The storage device of claim 7, wherein the storage device is configured to selectively disable other networked devices.

11. The storage device of claim 7, wherein a defective device issues a request to the storage device, the storage device further configured to issue at least one command to disable the defective device and notify other networked devices of the defective device's status.

12. A method for automatically providing firmware to a network of attached devices, the method comprising:

updating firmware of a storage device connected in the network of attached devices;

determining if firmware of at least one other storage device of the network of attached devices requires revision, and if so, updating the firmware of the at least one other storage device without utilizing an external platform;

detecting a defect or anomaly in a defective device;

transmitting a request regarding the defective device to a service pack leader of the network of attached devices;

the pack leader causing the defective device to go offline; and the pack leader transmitting the defective device's status to other network attached devices.

13. A method comprising:

operating a storage device connected in a network of attached devices in a first state wherein the storage device operates only to receive commands;

receiving a firmware update; and operating the storage device in a second state, comprising sending commands to at least one other storage device connected in the network of attached devices to update firmware on the at least one other storage device.

14. The method as set forth in claim 13, wherein operating further comprises:

scanning for a peer of a substantially similar storage device;

issuing a command to idle the peer device to prevent controller intervention; and issuing commands to update firmware in the at least one other storage device.

15. The method as set forth in claim 13, further comprising reconfiguring to the first state after the firmware update of the at least one other storage device.

16. A method comprising:

operating a storage device connected in a network of attached devices in a first state wherein the storage device operates only to receive commands;

receiving a notice of a defective storage device connected in the network of attached devices; and operating the storage device in a second state, comprising sending commands to disable the defective storage device and to notify other storage devices connected in the network of attached devices of the defective storage device's status.

* * * * *